(12) United States Patent  
Shinagawa et al.

(10) Patent No.: US 8,135,188 B2  
(45) Date of Patent: Mar. 13, 2012

(54) EFFICIENT FEATURES FOR SHAPE ANALYSIS OF LESIONS IN BREAST MR

(75) Inventors: Yoshihisa Shinagawa, Downingtown, PA (US); Gerardo Hermosillo Valadez, West Chester, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 839 days.

(21) Appl. No.: 12/204,953

(22) Filed: Sep. 5, 2008

(65) Prior Publication Data

US 2009/0067694 A1 Mar. 12, 2009

Related U.S. Application Data

(60) Provisional application No. 60/971,668, filed on Sep. 12, 2007.

(51) Int. Cl.  
*G06K 9/00* (2006.01)
(52) U.S. Cl. .................................................. 382/128
(58) Field of Classification Search ........................ None  
See application file for complete search history.

(56) References Cited

FOREIGN PATENT DOCUMENTS

EP    1 780 651 A    5/2007

OTHER PUBLICATIONS

Hilaga et al., "Topology Matching for Fully Automatic Similarity Estimation of 3D Shapes", Computer Graphics, SIGGRAPH 2001, Conference Proceedings, Los Angeles, CA, Aug. 12-17, 2001, pp. 203-212.

Selle, "Analyse von Geabstukuren in medzinschen Schihdaensaezen fuer de compuergesueze Operationsplanung", 2000, Shaker Verlag, Aachen.

Tung et al., "Augmented reeb graphs for content-based retrieval of 3D mesh models", Shape Modeling Applications, 2004, Proceedings Genova, Italy Jun. 7-9, 2004, Piscataway, NJ, USA, pp. 157-389.

Rohrschneider et al., "Shape Characterization of Extracted and Simulated Tumor Samples using Topological and Geometric Measures", Engineering in Medicine and Biology Society, 2007, EMBS 2007, 29th Annual International Conference of the IEEE, Piscataway, NJ, Aug. 1, 2007, pp. 6271-6277.

International Search Report including Notification of Transmittal of the International Search Report, International Search Report, and Written Opinion of the International Searching Authority.

*Primary Examiner* — Roberto Velez

(74) *Attorney, Agent, or Firm* — Peter Robert Withstandley

(57) ABSTRACT

A method for analyzing a shape of a region of interest in a medical image of a body part, including: finding a region of interest in the medical image; calculating a Reeb graph of the region of interest, and determining whether the region of interest is a malignant lesion candidate based on a shape characteristic of the Reeb graph.

19 Claims, 6 Drawing Sheets

(a) (b)

(a)

(b)

(c)

(d)

(a) (b)

EFFICIENT FEATURES FOR SHAPE ANALYSIS OF LESIONS IN BREAST MR

CROSS-REFERENCE TO RELATED APPLICATION

This application claims the benefit of U.S. Provisional Application No. 60/971,668, filed Sep. 12, 2007, the disclosure of which is incorporated by reference herein in its entirety.

BACKGROUND OF THE INVENTION

1. Technical Field

The present invention relates to detecting lesions in medical images, and more particularly, to using efficient features for shape analysis of lesions in breast MR.

2. Discussion of the Related Art

A key process of detecting regions in breast MR, also referred to as magnetic resonance breast imaging, involves shape analysis and pharmacokinetic analysis of candidate regions. Most of the existing shape features are scalars that reflect, to some extent, the complexity of the lesion boundary. A popular shape feature is the square root of the surface area $S^{1/2}$ divided by the cubic root of the volume $V^{1/3}$ of a candidate region. See [Chen, W. and Giger, M. L. and Bick, U. A Fuzzy C-Means (FCM)-Based Approach for Computerized Segmentation of Breast Lesions in Dynamic Contrast-Enhanced MR Images. Acad. Radiol., 13(1):63-72, 2006], for example. This feature shows how the shape deviates from a sphere, because a sphere attains the minimum of $S^{1/2}/V^{1/3}$.

Another well-known shape feature is fractal dimension, which is a scalar that is used, for example, in ONCAD by Penn Diagnostics and is described in Penn at al. [Penn, A. I., Loew, M. H. Estimating Fractal Dimension with Fractal Interpolation Function Models. IEEE Trans. Med. Imaging, 16(6):930-937, 1997], for example. The fractal dimension of an ordinary shape coincides with the ordinary definition of integer dimensions such as three dimensions for medical volumes. For a fractal shape that is defined recursively or by infinite iterations, its fractal dimension is higher than ordinary shapes and is a fractional number such as 3.55. Penn et al. used the fractional number to represent the complexity of the carcinoma shape. However, a carcinoma cannot have a dimension other than integers in a strict mathematical sense because it is not defined recursively nor by infinite iterations. Such scalars have limited descriptive power because they are only a one-dimensional projection of a very complicated feature.

SUMMARY OF THE INVENTION

In an exemplary embodiment of the present invention, a method for analyzing a shape of a region of interest in a medical image of a body part, comprises: finding a region of interest in the medical image; calculating a Reeb graph of the region of interest; and determining whether the region of interest is a malignant lesion candidate based on a shape characteristic of the Reeb graph.

The shape characteristic comprises a number of branches in the Reeb graph, and when the number of branches is above a threshold the region of interest is a malignant lesion candidate.

The shape characteristic comprises a number of branches in the Reeb graph that are above a length, and when the number of branches is above a threshold the region of interest is a malignant lesion candidate.

The method further comprises choosing a function from which to calculate the Reeb graph. The function is an isolation measure that is computed for each voxel in the region of interest.

The shape characteristic comprises a value that is obtained by dividing a value obtained from the isolation measures by a power of a volume of the region of interest, and when the value of the shape characteristic is above a threshold the region of interest is a malignant lesion candidate.

The value obtained from the isolation measures is an average of the isolation measures, a median of the isolation measures, a maximum of the isolation measures or a combination of the average, median or maximum of the isolation measures.

The power of the volume of the region of interest is a square root or a cubic root of the volume of the region of interest.

The isolation measure is represented by:

$$\mu(v) = \int_{p \in S} g(v,p) dS,$$

where v is a point of S at which to calculate $\mu$, p is a point of S, g(v,p) is a function that returns a distance between v and p of S, S is a portion of the region of interest and $\mu(v)$ is a mean of a distance from v to all points of S. S is a surface of the region of interest. The distance is a geodesic distance or a Euclidean distance.

The function is a radial unction that is computed for each voxel in the region of interest.

The radial function is represented by:

$$\mu(v) = d(v,c),$$

where d(v,c) is a Euclidean distance between v and c, c is a point of the region of interest and v is a point of the region of interest at which to calculate $\mu$. c is a centroid or a center of the region of interest.

The medical image comprises a magnetic resonance image or a computed tomography image.

The body part comprises a breast, a lung or liver.

In an exemplary embodiment of the present invention, a system for analyzing a shape of a region of interest in a medical image of a body part, comprises: a memory device for storing a program; a processor in communication with the memory device, the processor operative with the program to: find a region of interest in the medical image; calculate a Reeb graph of the region of interest; and determine whether the region of interest is a malignant lesion candidate based on a shape characteristic of the Reeb graph.

In an exemplary embodiment of the present invention, a method for analyzing a shape of a region of interest in a medical image of a body part, comprises: finding a region of interest in the medical image; calculating an isolation measure for each voxel in the region of interest; and determining whether the region of interest is a malignant lesion candidate by using the isolation measures.

In an exemplary embodiment of the present invention, a system for analyzing a shape of a region of interest in a medical image of a body part, comprises: a memory device for storing a program; a processor in communication with the memory device, the processor operative with the program to: find a region of interest in the medical image; calculate an isolation measure for each voxel in the region of interest; and determine whether the region of interest is a malignant lesion candidate by using the isolation measures.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
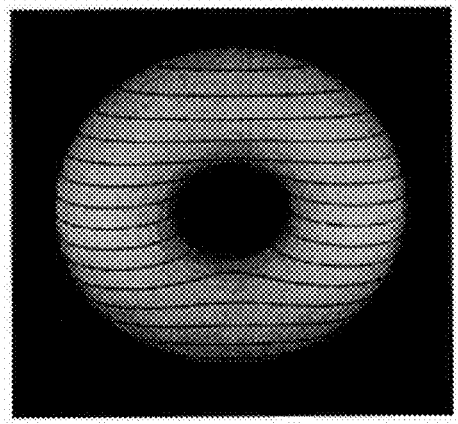
FIG. 1 shows a Torus in (a) and its Reeb graph in (b) using a height function.
Figure 1:
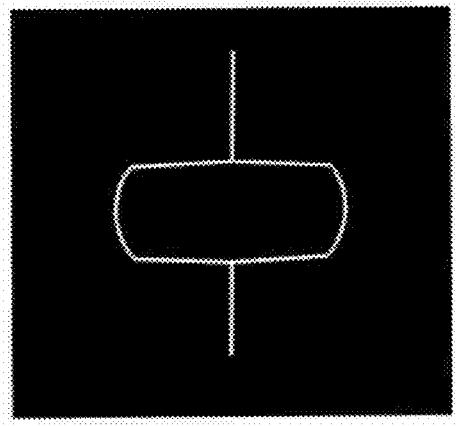

As discussed in the Background section of this disclosure, most of the shape features used in breast MR are scalars that have limited descriptive power. In accordance with an exemplary embodiment of the present invention, we use a graph structure to represent shapes of lesions in breast MR. The use of the graph structure can represent detailed shapes that help in discriminating lesions. For example, the method and system disclosed herein can be used to shortlist the candidates of malignant lesions so that radiologists can quickly scrutinize a small number of regions of interest.

In accordance with an exemplary embodiment of the present invention, we use a graph called the Reeb graph to represent a lesion shape. Reeb graphs were introduced to the computer graphics and vision community by one of the inventors of this application in [Y. Shinagawa and T. L. Kunii. Constructing a Reeb Graph Automatically from Cross Sections. IEEE Comp. Graph. and Applications, 11(6):44-51, 1991], the disclosure of which is incorporated by reference herein in its entirety. The graph represents a skeleton-like structure that characterizes the shape of the lesion. To calculate the Reeb graph, we define a function $f$ on the object M (regarded as a manifold). For this purpose, we have chosen the average geodesic distance function which came to be known as the isolation measure that is rotationally invariant, proposed in [M. Hilaga, Y. Shinagawa, T. Kohmura and T. L. Kunii. Topology Matching for Fully Automatic Similarity Estimation of 3D Shapes. SIGGRAPH 2001, pp. 203-212], the disclosure of which is incorporated by reference herein in its entirety. The Reeb graph is then defined as the quotient space of $f(M)$ with respect to an equivalence relation—where points p and q are equivalent if $f(p)=f(q)$ and $f^{-1}(p)$ and $f^{-1}(q)$ belong to the same connected component.

The calculation of the isolation measure in [M. Hilaga, Y. Shinagawa, T. Kohmura and T. L. Kunii. Topology Matching for Fully Automatic Similarity Estimation of 3D Shapes. SIGGRAPH 2001. pp. 203-212] was proportional to $n^2 \log n$ using Dijkstra's algorithm for obtaining the shortest paths where n is the number of object voxels. For rapid calculation of the isolation measure $f$, we propose a sampling strategy; i.e., we subdivide the object voxels into N groups and calculate the isolation measure of each group one by one. If the mean of the isolation measure is within a tolerance, we use the average of the group isolation measures as the inferred value. Otherwise, we continue the groupwise calculation until the values become statistically robust.

In our experiments, we calculated candidate regions of interest from Dynamic Contrast Enhanced Magnetic Resonance (MR) Images of breasts by detecting rapid enhancements. After computing the isolation measure of a candidate region of interest, we constructed its Reeb graph. We found that the average isolation measure divided by $V^{1/2}$ and the number of branches in the Reeb graph are useful features to discriminate malignant lesions.

A more detailed discussion of the Reeb graph and the Isolation Measure will now be presented.

Reeb Graph

A Reeb graph is a topological and skeletal structure for an object of arbitrary dimensions. In Topology Matching, the Reeb graph is used as a search key that represents the features of a 3D shape. The definition of a Reeb graph is as follows:

Definition: Reeb graph—Let $\mu:C \rightarrow R$ be a continuous function defined on an object C. The Reeb graph is the quotient space of the graph of $\mu$ in $C \times R$ by the equivalent relation $(X_1,\mu(X_1)) \sim (X_2,\mu(X_2))$ which holds if an only if $\mu(X_1)=\mu(X_2)$, and $X_1$ and $X_2$ are in the same connected component of $\mu^{-1}(\mu(X_1))$.

When the function $\mu$ is defined on a manifold and critical points are not degenerate, the function $\mu$ is referred to as a Morse function, as defined by Morse theory in [Y. Shinagawa, T. L. Kunii and Y. L. Kergosien. Surface Coding Based on Morse Theory. IEEE Computer Graphics and Applications, Vol. 11. No. 5, pp. 66-78, September 1991], for example; however, Topology Matching is not subject to this restriction.

If the function $\mu$ changes, the corresponding Reeb graph also changes. Among the various types of $\mu$ and related Reeb graphs, one of the simplest examples is a height function on a 2D manifold. That is, the function $\mu$ returns the value of the z-coordinate (height) of the point v on a 2D manifold:

$$\mu(v(x,y,z))=z.$$

Many studies have used the height function as the function $\mu$ for generating the Reeb graph, see [Y. Shinagawa, T. L. Kunii and Y. L. Kergosien. Surface Coding Based on Morse Theory. IEEE Computer Graphics and Applications, Vol. 11, No. 5, pp. 66-78, September 1991, M. de Berg and M. van Kreveld. Trekking in the Alps Without Freezing or Getting Tired. Algorithmica, Vol. 18, pp. 306-323, 1997, M. van Kreveld, R. van Ostrum, C. Bajaj, V. Pascucci and D. Schikore. Contour Trees and Small Seed Sets for Isosurface Traversal. Proc. Symp. Computational Geometry, pp. 212-220, 1997, S. Takahashi, Y. Shinagawa and T. L. Kunii. A Feature-based Approach for Smooth Surfaces. Proc. Symp. Solid Modeling, pp. 97-110, 1997 and S. P. Tarasov and M. N. Vyalyi. Construction of Contour Trees in 3D in O(n log n) Steps. Proc. Symp. Computational Geometry, pp. 68-75, 1998], for example.

FIG. 1 shows the distribution of the height on the surface of a torus in (a) and the corresponding Reeb graph in (b). On the left side of FIG. 1, red and blue coloring (represented by the shaded lower portion of the Torus and the shaded upper portion of the Torus, respectively) represents minimum and maximum values, respectively, and the black lines represent the isovalued contours. The Reeb graph on the right side of FIG. 1 corresponds to connectivity information for the isovalued contours.

Isolation Measure

A Reeb graph is generated by a continuous function μ. If a different function is used as μ, the Reeb graph will change. The function μ is defined for the application in question. For example, in terrain modeling applications or when modeling a 3D shape based on cross sections such as CT images, the height function has been a useful function μ because these applications are strictly bound by height. However, the height function is generally not appropriate as a search key for identifying a 3D shape because it is not invariant to transformations such as object rotation. Though the use of curvature as the function μ may provide invariance in a rotation, it is generally not appropriate as a search key for identifying a 3D shape, because a stable calculation of curvature is difficult on a noisy surface, and small undulations may result in a large change of curvature, causing sensitivity in the structure of the Reeb graph.

To define a function μ that is appropriate as a search key for identifying a 3D shape, we use a geodesic distance, that is, the distance from point to point on a surface. Using geodesic distance provides rotation invariance and resistance against problems caused by noise or small undulations. In one case, Lazarus et al. [F. Lazarus and A. Verroust. Level Set Diagrams of Polyhedral Objects. Proc. Symp. Solid Modeling, pp. 130-140, 1999] proposed a level set diagram (LSD) structure in which geodesic distance from a source point is used as the function μ. However, in this case, the function μ is only suitable for constructing a reasonable set of cross sections of a 3D shape. To make a search key for 3D shapes, the source point is determined automatically and in a stable way. However, a small change in the shape may result in an entirely different source point, creating an obstacle for the construction of a stable Reeb graph.

To avoid this, we construct the function μ at a point v on a surface S as follows:

$$\mu(v) = \int_{p \in S} g(v,p) dS \quad (1)$$

where the function g(v,p) returns the geodesic distance between v and p on S. This function μ(v) has no source point and hence is stable, and it represents the degree of center or edge on a surface. Since μ(v) is defined as a sum of a geodesic distance from v to all points on S, a small value means that a distance from v to arbitrary points on the surface is relatively small, that is, the point v is nearer the center of the object.

Here, note that the function μ(v) is not invariant to scaling of the object. To handle this issue, a normalized version of μ(v) is used:

$$\mu_n(v) = \frac{\mu(v) - \min_{p \in S} \mu(p)}{\max_{p \in S} \mu(p)}$$

In this normalization, $\text{range}(S) = \max_{p \in S} \mu(p) - \min_{p \in S} \mu(p)$ may also be a candidate for the denominator, however it is not employed because it amplifies errors when range(S) is small, particularly in the case of a sphere, where range(S)=0. The value $\min_{p \in S} \mu(p)$ corresponds to a most central part of the object, and a shift can be introduced to initially match the centers of different objects when estimating similarity between them, as described below.

Figure 2:
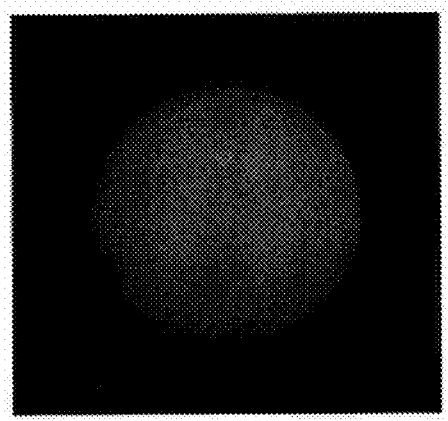
FIG. 2 shows examples of the distribution of the function $\mu$ and its isovalued contours for Topology Matching: (a) sphere; (b) cube, (c) tours and (d) cylinder.
Figure 2:
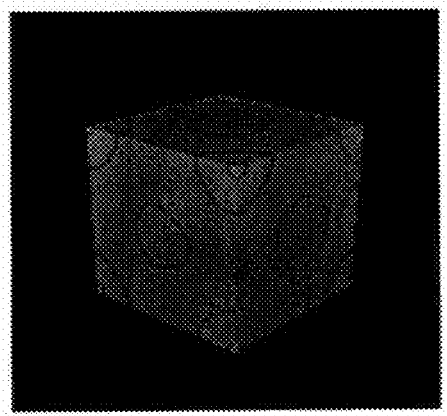
Figure 2:
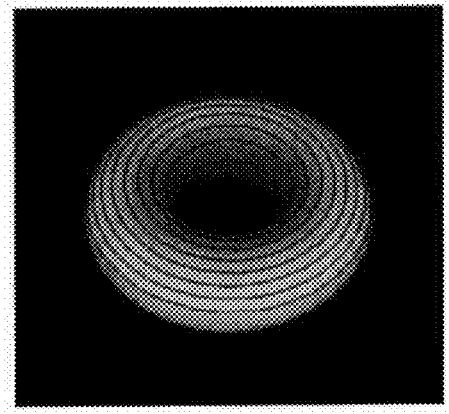
Figure 2:
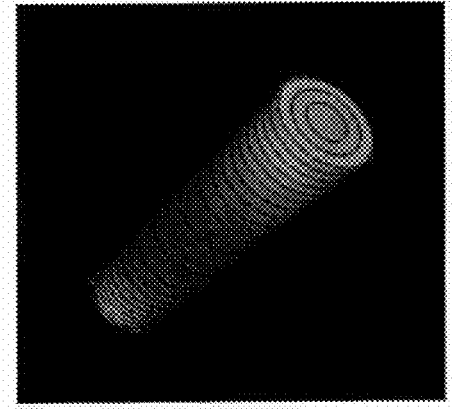

Examples of the function $\mu_n(v)$ defined on several primitive objects are shown in FIG. 2 where the coloring has the same meaning as in FIG. 1. For example, although not shown, the sphere in image (a) is completely red, the cube in image (b) is completely red, but for the black lines, the torus in image (c) is red in inner portion thereof and the cylinder in image (d) is red in the center thereof. Notice that the sphere has a constant value of $\mu_n(v)=0$ and more asymmetric shapes have a wider range of values for $\mu_n(v)$.

Figure 3:
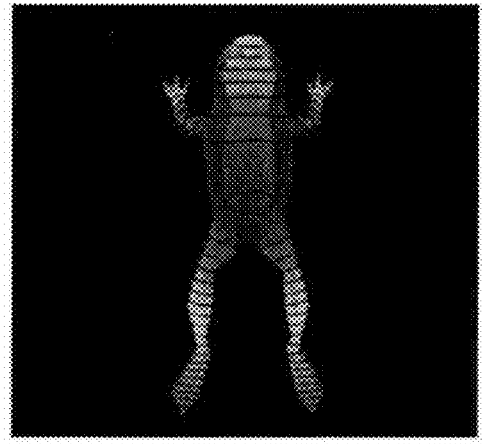
FIG. 3 is an example of a deformed shape in (a) and (b) showing distribution of the function $\mu$.
Figure 3:

The function $\mu_n(v)$ is particularly useful because it is resistant to the type of deformation shown in FIG. 3. This is because the deformation does not drastically change the geodesic distance on the surface. Note that the coloring in FIG. 3 has the same meaning as in FIG. 1. In FIG. 3, the central shaded portion of the frog in (a) and (b) is red and the lower feet of the frog are blue.

Thus, the normalized integral of geodesic distance is suitable as the continuous function for Topology Matching.

A method for detecting lesions in medical images via shape analysis in accordance with an exemplary embodiment of the present invention will now be described with reference to FIG. 4.

Figure 4:
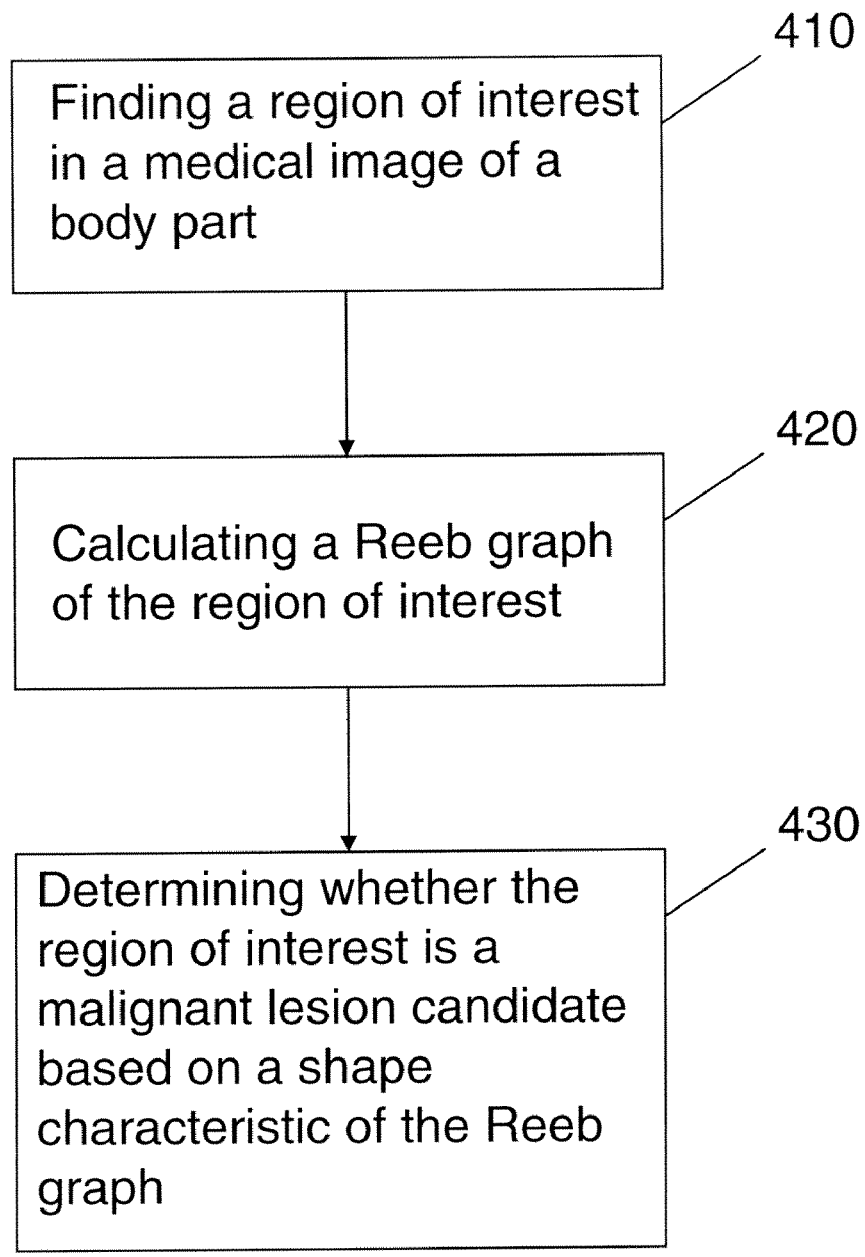
FIG. 4 is a flow diagram of a method for detecting lesions in medical images via shape analysis in accordance with an exemplary embodiment of the present invention.

As shown in FIG. 4, a region of interest is found in a medical image of a body part (410). The region of interest can be found by using any suitable image segmentation technique, such as snakes for computed tomography (CT) and thresholding for MR, for example. The body part can be a breast, a lung or a liver, for example. The medical image can be an MR image or a CT image, for example.

A Reeb graph of the region of interest is calculated (420). As described above, the Reeb graph is calculated by defining a function f on the object M (i.e., the region of interest). The function f can be the isolation measure (μ) or a radial function, for example.

The isolation measure is computed for each voxel in the region of interest in accordance with Equation 1 above. It is noted that, in Equation 1 as used here, v is a point of S at which we want to calculate the functional value of μ, p is any point of S, and g(v,p) is a function that returns a distance between v and p of S, S is a portion of the region of interest and μ(v) is a mean of a distance from v to all points of S. S can be a surface of the region of interest.

The radial function is computed for each voxel in the region of interest in accordance with the following equation:

$$\mu(v) = d(v,c) \quad (2)$$

where d(v,c) is a Euclidean distance between v and c, c is a point of the region of interest, such as its centroid or the center of a circumscribed sphere, which represents the region of interest, and v is any point of the region of interest at which we want to calculate the functional value of μ.

A determination is made as to whether the region of interest is a malignant lesion candidate based on a shape characteristic of the Reeb graph (430). This is done in a variety of ways. For example, in one technique, the number of branches in the Reeb graph is used to determine if the region of interest is a malignant lesion candidate. Thus, if the number of branches is above a threshold, such as 20 branches, for example, the region of interest is marked as a malignant lesion candidate. In another technique, a number of branches in the Reeb graph that are above a certain length, such as the average of all the branch lengths, for example, is compared against a threshold, and if the number is above the threshold, the region of interest is marked as a malignant lesion candidate.

In yet another technique, an average of all the isolation measures can be obtained and divided by a square root of the volume of the region of interest. If this value is above a threshold, such as, 0.5, for example, the region of interest is marked as a malignant lesion candidate. Instead of dividing the average of the isolation measures by the square root of the volume of the region of interest, a median or a maximum of the isolation measures can be divided by the square root or the cubic root of the volume of the region of interest. Similarly, the average of the isolation measures can be divided by the cubic root of the volume of the region of interest. Further, a combination, either linear (⅓, ⅓ and ⅓) or non-linear (½, ¼ or ⅓), of the average, median and maximum isolation measures can be divided by the square or cubic root of the volume of the region of interest and used to determine whether the region of interest is a malignant lesion candidate.

Figure 5:
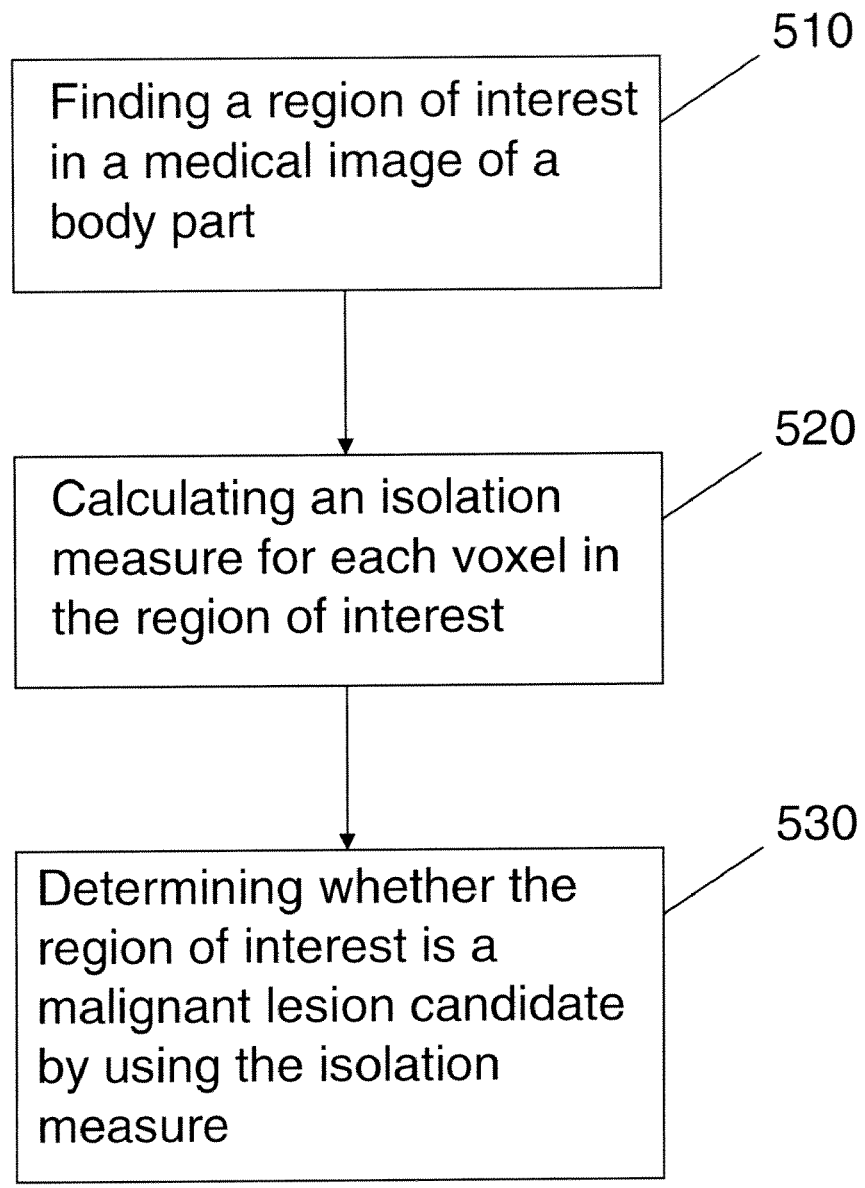
FIG. 5 is a flow diagram of a method for detecting lesions in medical images via shape analysis in accordance with an exemplary embodiment of the present invention.

It is to be understood that the above-described isolation measure technique can be used to supplement the malignancy determination made by the branches or it can be used without constructing a Reeb graph to determine whether a region of interest should be marked as a malignant lesion candidate. In this case, the method as shown in FIG. 5 may be employed. As shown in FIG. 5, similar to that shown in FIG. 4, a region of interest is found in a medical image of a body part (510). However, instead of calculating a Reeb graph for the region of interest, an isolation measure is calculated for each voxel in the region of interest (520). A determination is made as to whether the region of interest is a malignant lesion candidate by using the isolation measures, by using the techniques just described (530).

The thresholds described above can be determined by training a classifier on relevant sets of image data.

The methods described with reference to FIGS. 4 and 5 are automatically performed by a computer, for example.

A system in which exemplary embodiments of the present invention may be implemented will now be described with reference to FIG. 6.

Figure 6:
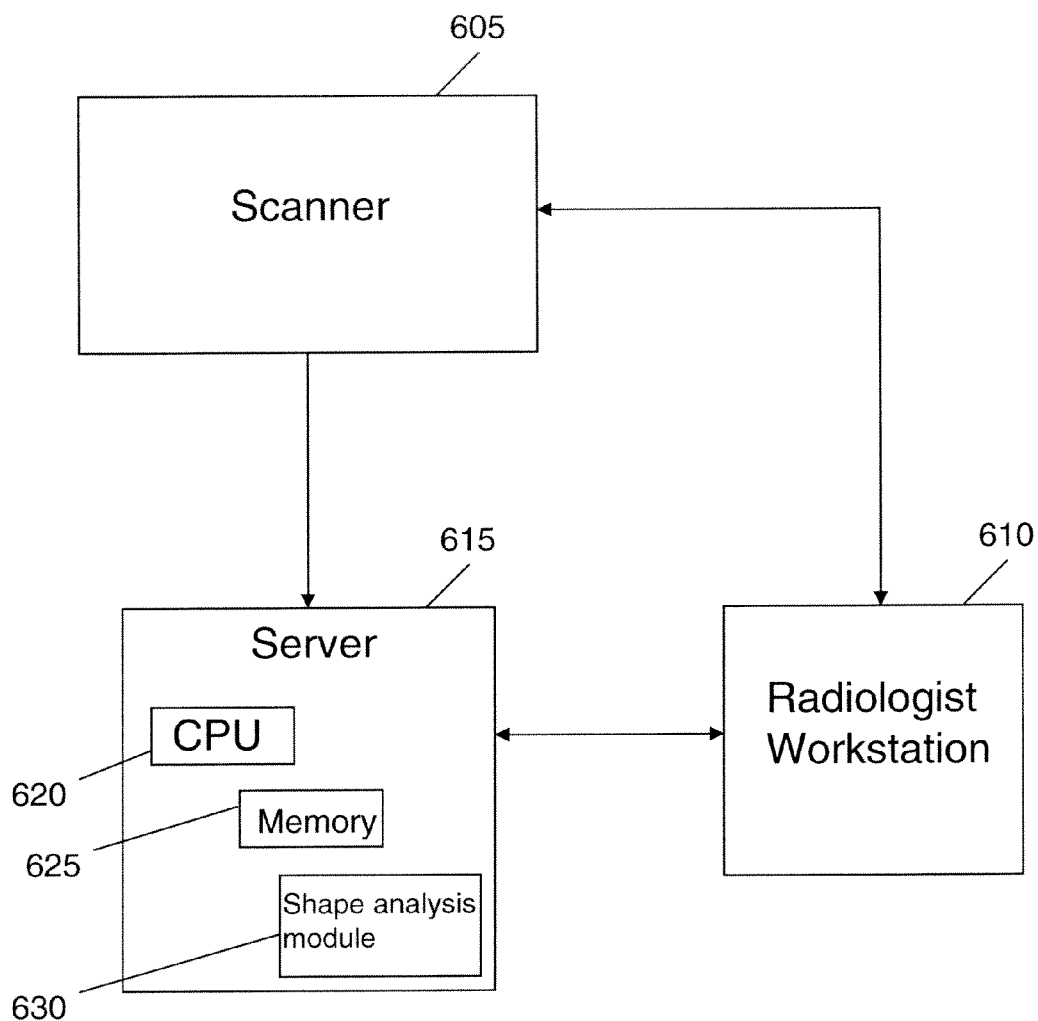
FIG. 6 is a block diagram of a system in which exemplary embodiments of the present invention may be implemented.

As shown in FIG. 6, the system includes a scanner 605, a server 615 and a radiologist workstation 610 connected over a wired or wireless network (indicated by the arrows). The scanner 605 may be an MR or CT scanner, for example.

The server 615 includes, inter alia, a central processing unit (CPU) 620, a memory 625 and a shape analysis module 630 that includes program code for executing methods in accordance with exemplary embodiments of the present invention.

The radiologist workstation 610 includes a computer, which may also include a shape analysis module that includes program code for executing methods in accordance with exemplary embodiments of the present invention, and appropriate peripherals, such as a keyboard and display, and is used to operate the system. For example, the radiologist workstation 610 may communicate directly with the scanner 605 so that image data collected by the scanner 605 can undergo real-time shape analysis and be viewed on its display. The radiologist workstation 610 may also communicate directly with the server 615 to access previously processed image data, such as that which has undergone our shape analysis, so that a radiologist can manually verify the results of the shape analysis.

It is to be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It should also be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is to be further understood that the above description is only representative of illustrative embodiments. For convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for analyzing a shape of a region of interest in a medical image of a body part, comprising:
    collecting, by a scanner, the medical image of the body part;
    finding, by a processor, a region of interest in the medical image;
    calculating, by the processor, a Reeb graph of the region of interest; and
    determining, by the processor, whether the region of interest is a malignant lesion candidate based on a shape characteristic of the Reeb graph.

2. The method of claim 1, wherein the shape characteristic comprises a number of branches in the Reeb graph, and when the number of branches is above a threshold the region of interest is a malignant lesion candidate.

3. The method of claim 1, wherein the shape characteristic comprises a number of branches in the Reeb graph that are above a length, and when the number of branches is above a threshold the region of interest is a malignant lesion candidate.

4. The method of claim 1, further comprising:
    choosing a function from which to calculate the Reeb graph.

5. The method of claim 4, wherein the function is an isolation measure that is computed for each voxel in the region of interest.

6. The method of claim 5, wherein the shape characteristic comprises a value that is obtained by dividing a value obtained from the isolation measures by a power of a volume of the region of interest, and when the value of the shape characteristic is above a threshold the region of interest is a malignant lesion candidate.

7. The method of claim 6, wherein the value obtained from the isolation measures is an average of the isolation measures, a median of the isolation measures, a maximum of the isolation measures or a combination of the average, median or maximum of the isolation measures.

8. The method of claim 6, wherein the power of the volume of the region of interest is a square root or a cubic root of the volume of the region of interest.

9. The method of claim 5, wherein the isolation measure is represented by:

$$\mu(v) = \int_{p \in S} g(v,p) dS,$$

where v is a point of S at which to calculate μ, p is a point of S, g(v,p) is a function that returns a distance between v and p of S, S is a portion of the region of interest and μ(v) is a mean of a distance from v to all points of S.

10. The method of claim 9, wherein S is a surface of the region of interest.

11. The method of claim 9, wherein the distance is a geodesic distance or a Euclidean distance.

12. The method of claim 4, wherein the function is a radial function that is computed for each voxel in the region of interest.

13. The method of claim 12, wherein the radial function is represented by:

$$\mu(v) = d(v,c),$$

where d(v,c) is a Euclidean distance between v and c, c is a point of the region of interest and v is a point of the region of interest at which to calculate μ.

14. The method of claim 13, wherein c is a centroid or a center of the region of interest.

15. The method of claim 1, wherein the medical image comprises a magnetic resonance image or a computed tomography image.

16. The method of claim 1, wherein the body part comprises a breast, a lung or liver.

17. A system for analyzing a shape of a region of interest in a medical image of a body part, comprising:
a memory device for storing a program;
a processor in communication with the memory device, the processor operative with the program to:
find a region of interest in the medical image;
calculate a Reeb graph of the region of interest; and
determine whether the region of interest is a malignant lesion candidate based on a shape characteristic of the Reeb graph.

18. A method for analyzing a shape of a region of interest in a medical image of a body part, comprising:
collecting, by a scanner, the medical image of the body part;
finding, by a processor, a region of interest in the medical image;
calculating, by processor, an isolation measure for each voxel in the region of interest; and
determining, by the processor, whether the region of interest is a malignant lesion candidate by using the isolation measures.

19. A system for analyzing a shape of a region of interest in a medical image of a body part, comprising:
a memory device for storing a program;
a processor in communication with the memory device, the processor operative with the program to:
find a region of interest in the medical image;
calculate an isolation measure for each voxel in the region of interest; and
determine whether the region of interest is a malignant lesion candidate by using the isolation measures.

* * * * *